United States Patent Office 3,679,454
Patented July 25, 1972

---

3,679,454
EDGE-INKING OF SHOE SOLES AND
COLORING OF UPPERS
John G. Penniman, Jr., 200 Tompkins Ave.,
Pleasantville, N.Y. 10570
No Drawing. Filed Nov. 25, 1969, Ser. No. 879,946
Int. Cl. B44d 1/16, 1/10
U.S. Cl. 117—44
8 Claims

ABSTRACT OF THE DISCLOSURE

Black edge ink dye or other high strength or jetness dye is applied to the edge of shoe soles and top-lift of heels in such a manner that the edge-sole and top-lift do not have to be masked when the shoe upper attached thereto is colored by brushing or spraying, by the use of a water-insoluble black dye in the edge ink which is soluble in the resin used in the color coat and/or in a lacquer solvent used as a topcoat over the previously colored shoe upper. When a lacquer is applied to the upper portion of the shoe, it is also applied to the edge-sole and top-lift portions of the shoe, the resin in the color coat and/or the solvent in the lacquer topcoat, causing the dye coated thereon or impregnated therein to bleed or leach through the color applied to the upper, which incidentally also colored the edge-sole and top-lift to its original color, advantageously black.

BACKGROUND OF THE INVENTION

(1) Field of the invention

This invention relates to coloring of leather, synthetic polymeric or poromeric shoe uppers and more particularly, to a new method of applying edge ink containing an advantageously black dye to the edges of shoe soles and heels whereby masking and retouching is not necessary when the shoe uppers are colored while attached to the soles and heels, and the sole and heel edges are to be colored.

(2) Description of the prior art

A large portion of the consumer market, particularly women, consider it desirable to match the finish on their leather accessories with their wardrobe colors. One advantageous system for coloring shoes is described in my U.S. Pat. No. 3,424,300. As described in the above patent, the shoes are delivered to the retailer having the soles, heels and uppers completely fabricated and the shoe upper portion is of a white or light gray color capable of being colored as described in the above patent. One of the problems faced in the prior art was that in coloring the uppers of leather shoes, it was necessary to mask the edge-sole. This was accomplished by masking with pressure sensitive plastic or paper tape or strippable coating. A disadvantage was that the masking was almost unavoidably imperfect, and it was usually necessary to touch up the vamp of the shoe which had been masked out by improperly applied masking or remove color from inadequately masked edge-sole, or both. This process was also time-consuming and costly, requiring a good deal of labor. Further, such touching up frequently impaired the aesthetic quality of the finished product. After the color has been applied to the shoe upper and the sole-edges touched up, the lacquer topcoat is applied over the colored upper.

SUMMARY OF THE INVENTION

The present invention is based upon the discovery that an edge ink can be applied to the shoe sole-edges and top-lifts of a fully fabricated shoe, or prior to its fabrication, by a water insoluble black dye dissolved in a suitable solvent, which dye is also mutually soluble in the resin used in the formulation of the color coat and/or in the solvent used for applying the lacquer topcoat to the upper portion of the shoe and upon application of the resin containing color coating or the lacquer to the upper portion of the shoe over the color coat as well as to the sole-edge, the solvent used to dissolve the lacquer or the resin in the color coat causes the black dye to bleed through any color that happens to be incidentally applied on the edge-sole during the color coating application.

DESCRIPTION OF THE PREFERRED EMBODIMENTS

The invention can be carried out in two different manners. One method involves the application of a black dye of suitable jetness to the edge-soles and top-lift portions of the shoes and the application of a color coating to the top portion of the shoes containing a resin in which the black dye used for the edge-soles and top-lift portions of the shoes is highly soluble. In practicing this aspect of the invention the water insoluble black dye is applied to the edge-soles and top-lifts and the soluble resin color coat is applied to the upper portion of the shoes and any of the color incidentally applied to the edge-soles or top-lifts causes the black dye to bleed through this incidentally applied color and render the entire shoe edges and top-lifts of a uniform black color due to the solubility of the black dye in the resin used in the color coat. This process is particularly advantageous where no or only a small amount of inorganic pigment is present in the color coat. When this aspect of the invention is used, shoes can have the upper portions colored without the necessity of applying a lacquer topcoat, provided the topcoat is not necessary for protection or for the aesthetic value.

A suitable black dye that can be used according to this aspect of the invention is the Sudan Deep Black BN dye disclosed in the following examples. Examples of resins which can be used in combination therewith in which this black dye is highly soluble include those acrylic resins disclosed in U.S. Pat. No. 3,424,300 and in my copending application Ser. No. 472,028, filed July 14, 1965, now abandoned. Other combinations of resins and dyes in which the dye is highly soluble can of course be used and can be determined by routine experimentation by those skilled in the art.

The second aspect of this invention involves the application of the ink edge dye to the sole-edges and/or top-lifts, applying to the shoe upper a resin containing color coating, such as described in the above mentioned patent and application, drying the coating and applying to the shoe upper and shoe-edges and the top-lifts a lacquer coating which contains a solvent for the dye to cause bleeding of the dye through any incidentally applied color coating to the sole-edges or top-lifts to cover or obliterate the incidentally applied color coating.

In operation of the second process of the invention, after the appropriate color has been selected in accordance with the above-mentioned patent, the color is preferably sprayed onto the shoe uppers without masking the sole-edges. After the color has been dried, the color product incidentally applied to the bottom-sole is wiped off with a damp cloth. Then an appropriate lacquer is applied to the shoe upper as well as to the shoe sole-edge. The solvent used for dissolving the lacquer then penetrates the color coat and causes bleeding or leaching of the dye soluble in the lacquer solvent through the color incidentally applied thereto, rendering those portions black or dark brown as well as the entire sole-edge. In this manner, an edge-sole need not be masked when coloring leather uppers and the finished article can be produced more quickly and with superior aesthetic appearance. If the dye employed in the edge-sole is also soluble in the resin used in the upper color coat, this will also aid in obliterating any incidentally applied color to the edge-soles.

The use of a lacquer to effect obliteration of any incidentally applied coating color in which the lacquer solvent is also a solvent for the edge ink dye can advantageously be used where the edge ink dye is not particularly soluble in the resin or other components of the color coating for the upper portion of the shoes.

The use of a lacquer topcoat is particularly advantageous where the color topcoat contains a high concentration of inorganic pigment which inhibits the bleeding out of the edge ink dye even if it is soluble in the resin used in the formulation of the shoe upper color coating composition. Colors which normally contain sufficiently high amounts of organic pigments to render the use of the lacquer topcoat advantageous in order to effect the bleeding of the black dye to obliterate any incidentally applied color would include some brown, white, gray, orange, or yellow color where inorganic pigments are more commonly used, and most pastel colors.

The exact amount of inorganic pigment present in the color coating compositions which might require the application of a lacquer containing a solvent for the edge ink dye will vary depending upon the extent of the solubility of the edge dye in the color coating resin used for the upper portions of the shoe and the particular inorganic pigments employed therin. The exact or optimum amount of inorganic pigment which might require the use of a lacquer solvent to effect the obliteration of any incidentally applied color can be determined by those skilled in the art by routine experimentation.

Edge ink is normally applied in the following manner in an efficient high-volume, medium-price shoe factory. The bottom soles are cut of leather or of a synthetic shoe soling material, such as Goodyear's Neolite, which is a slightly expanded vinyl plastisol product, treated on the bottom sole with a chemical coating for protective and decorative purposes in a known manner. The edge ink containing the dye described herein can be used on any soling material that is in general use, including leather. Sheets of the material used for the sole are stapled together and a right and left foot sole die cut simultaneously. After the pair of bottom soles are cut, the upper part thereof is scribed around the outer edge in a band about half an inch wide, thereby providing a thinner edge sole for aesthetic reasons. It is considered advantageous in the art to do the scribing in such a manner so a rough surface is obtained to enable improved mechanical adhesion in the subsequent cementing process of the sole to the upper. Thereafter, the bottom soles are stacked and sprayed with edge ink in such a manner that the vertical stack of pairs and each individual pair is thoroughly coated with an edge ink including the upper scribed side of the edge-soles and preferably the top-lifts. After the edge ink is applied a hot-melt adhesive is applied to the upper surface of the sole, and the leather uppers are attached by conventional means.

In the preferred embodiment it is advantageous to use a black dye of suitable jetness, water-insolubility and with a high degree of solubility in solvents, such as methylisobutyl ketone, methylethyl ketone, toluene, acetone and other like solvents generally used for the application of lacquer and/or in the resin used for formulate the color top coating composition. One such dye is "Sudan Deep Black BN," manufactured by General Aniline and Film, though generally, any dye can be used as long as it conforms to the basic properties described above. "Sudan Deep Black BN" is aniline→1-naphthylamine→2,3-dihydro-2,2-dimethyl perimidine. Other suitable black dyes can be used as will be apparent to those skilled in the art and those of most optimum value can readily be determined by routine experimentation. Numerous black dyes are also listed in many known text books. Other dyes of suitable jetness could be used so long as they meet the requirements as described herein for the black dyes, such as dark brown.

It is considered advantageous in the preferred embodiment to provide a binder for the dye which would enable the use of an appropriately large amount of dye in the edge ink and at same time minimize crocking. Vinyl acrylic lacquers or vinyl chloride lacquers is one method of achieving this result. Other resins or binders can be used as will be apparent to persons skilled in the art. The use of resin binders are well known and used in the art. Advantageous results are also obtained if the binder used for the dye is also soluble in the lacquer solvent and for the resin used to formulate the upper color coating composition.

When so formulated, it was found that edge ink containing the Sudan Deep Black BN dye in a percentage by weight greater than 6 percent had a bronzing effect on the edge-sole, particularly when using the lacquer solvent to cause obliteration, and when less than 2 percent by weight was used in the edge ink, the dye does not generally sufficiently color the edge-sole and bleeding through the color is diminished when the topcoat is applied. The use of other systems including other black dyes, resin binders or solvents will result in different percentages which can be determined by those skilled in the art by routine experimentation.

The leather uppers are then tinted to any desired color or hue. One advantageous way of doing this is by the Color Compliment® process, described in U.S. Pat. No. 3,424,300.

A suitable color coating composition can be prepared, for example, in a conventional high speed disc Cowles Disperser by mixing an acrylic emulsion polymer prepared in the conventional manner from 79.5 parts of ethyl acrylate, 19.5 parts of methyl methacrylate, and 1 part of itaconic acid which is water insoluble; with an organic pigment, a dye, potassium tripoly phosphate, Igepal CO 630, terpineol, phenyl mercury acetate, and hydroxyl ethyl cellulose. This color coating composition is applied by a spray application under ambient conditions, to a pair of unfinished or semifinished leather shoes. Other pigmented resinous color coating compositions, such as polyurethane can also be used as will be apparent to those skilled in the art.

The lacquer topcoat of this invention may be any conventional solvent coating or emulsion coating having a clear glass-like appearance and having sufficient adhesion, flexibility, water resistance and abrasion resistance that the properties of a normal leather upper finish are obtained, such as conventional solvent lacquers or lacquer emulsions and the dye used in the edge ink has a high degree of solubility in the solvent used for the lacquer. Lacquer solvents which have been found suitable include acetone, methylisobutyl ketone, methylethyl ketone, and toluene. The above-mentioned solvents are particularly suitable for the Sudan Deep Black BN dye. When other dyes are used, the solvent for the lacquer should be selected so as to have sufficient solubility for the black dye used to cause bleeding through the color coat incidentally applied thereto. Thus various lacqeurs containing for example polyurethane, vinyl, acrylic, and nitrocellulose resins dissolved in a suitable solvent can be used.

The lacquer topcoat can be sprayed on the leather upper and sole and top-lift portion of the shoe after the color coating on the upper portions of the shoes have dried. The black dye then bleeds through any color incidentally present on the sole and top-lift portion, whereby an edge-sole and top-lift with a high degree of jetness is obtained. An example of the preferred embodiment is described below:

Black edge-sole ink was prepared according to the following formula:

| Raw material: | Weight, lbs. |
|---|---|
| Polyvinyl chloride-vinyl acetate copolymer | 20.4 |
| Acrylic resin | 18.0 |
| Methylisobutyl ketone | 700.4 |
| Plasticizer (Rohm & Haas Monoplex S-73) | 13.2 |
| Sudan Deep Black BN dye (GAF) | 48.0 |
| Total | 800.0 |

A stack of soles were sprayed with this edge ink in such a manner that the vertical stack of pairs and each individual pair was thoroughly coated with the edge ink on the edge-sole and about ⅛ inch of scribed top of sole, and the edge ink was then allowed to dry.

A lacquer barrier coating was then prepared by mixing 760 lbs. of methylethyl ketone and 40 lbs. of ½ sec. isobutyrate resin, an Eastman Chemical cellulose acetate-isobutyrate resin. This is applied over the edge-sole ink to protect the ink and keep the dye from staining the shoe upper during the cleaning of the upper with naphtha in the packing room.

The lasted leather uppers were then cemented to the soles by conventional means. A green hue coloring for the leather upper was then prepared by mixing in sufficient quantity according to the formula one ¼-ounce green pod of ½ strength, one ¼-ounce blue pod of 1/32 strength, one ¼-ounce white pod (full strength), and one ¼-ounce pod of black (2.6 PVC), as disclosed in 11. 18-23, column 3 of my U.S. Pat. No. 3,424,300. This coloring coating composition was then sprayed on the leather uppers of a number of pairs of women's shoes and allowed to dry.

A top coat lacquer is formulated as follows:

| | Pounds | Weight, percent |
|---|---|---|
| Polyvinyl chloride-vinyl acetate copolymer resin | 40.8 | 2.6 |
| Acrylic resin | 36.0 | 2.3 |
| Plasticizer (Monoplex S-73) | 26.4 | 1.7 |
| Methylisobutyl ketone | 694.4 | 43.25 |
| Colloidal silica (Cabosil M-5) | 2.4 | 0.15 |
| Methylisobutyl ketone MIBK | 800.0 | 50.0 |

The additional MIBK is to further dilute the lacquer for aerosol application.

This top coat mixture was then sprayed on the leather upper and sole and heel portion of the shoe. After drying, it was observed that the black dye bled through the green color incidentally applied on the edge-sole and top-lift and the edge-sole and top-lift after drying were of a uniform black color, of a high degree of jetness.

Shoes prepared containing the black edge-sole ink according to the formula given above were also directly sprayed with an upper color coating containing no inorganic pigment, including the red and blue upper coating compositions disclosed in the above noted U.S. Pat. No. 3,424,300. Upon application of this color to the shoes, the incidentally applied color to the edge-soles and top-lifts causes a bleeding of the black dye therethrough and effectively obliterates the color incidentally applied thereto without the necessity of the application of the solvent lacquer topcoat.

The polyvinyl chloride-acetate copolymer used in the above examples is manufactured by Union Carbide under the trade name VYMS. The acrylic resin used was that marketed by Rohm and Haas under the trademark A-101. The particular resinous material used in the edge-sole ink or topcoat lacquer is not critical and various other known resins can be used as will be apparent to those skilled in the art so long as they meet the physical requirements, as set forth herein.

Other plasticizing agents for polyvinyl chloride resins can also be employed in place of or in addition to the monomeric plasticizer marketed by Rohm and Haas Company under the trade name Monoplex S-73, such as dioctyl sebacate, didecyl adipate, dioctyl phthalate, and so forth, as will be apparent to those skilled in the art.

I claim:

1. In a process of applying a color coat containing a resin to the upper portion of shoes during which a portion of the color coating is incidentally applied to the edge sole or top-lift portion of the shoes, the improvement comprising first applying to the edge-sole and top-lift portion a water insoluble dye as an edge ink component, then applying a color coat containing a resin to a part of or all of the upper portion of the shoe during which a portion of the color coating is incidentally applied to the edge-sole or top-lift portion of the shoes and finally applying to the sole-edges and top-lifts of the shoe a lacquer containing a solvent which is also a solvent for the dye in the edge ink causing the edge ink dye to bleed out therefrom through the color incidentally applied thereto to cover or obliterate the incidentally applied color on the sole-edge and top-lift and to render the entire sole-edge and top-lifts of uniform color.

2. The process of claim 1 in which the edge ink dye is black.

3. The process according to claim 2 in which the lacquer contains acetone, methylisobutyl ketone, methylethyl ketone or toluene as a solvent, which solvent is also a solvent for the black dye applied to the sole-edges and top-lift.

4. The process of claim 2 in which the black edge ink is also soluble in the resin contained in the color coat.

5. The process of claim 4 in which the resin is an acrylic resin.

6. The process of claim 2 in which the black dye is aniline→1-naphthylamine→2,3 - dihydro - 2,2 - dimethyl perimidine.

7. The process of claim 3 in which the black dye is aniline→1-naphthylamine→2,3 - dihydro - 2,2 - dimethyl perimidine.

8. A process of claim 2, wherein the upper color coat is a pigmented aqueous acrylic polymer emulsion.

References Cited

UNITED STATES PATENTS

| 3,331,147 | 7/1967 | Isaacson | 117—44 |
| 3,057,749 | 10/1962 | Luzena | 117—76 R |
| 2,629,956 | 3/1953 | Switzer | 117—45 |
| 2,273,305 | 2/1942 | Whitehead | 117—63 |

ALFRED L. LEAVITT, Primary Examiner

M. F. ESPOSITO, Assistant Examiner

U.S. Cl. X.R.

117—43, 45, 63, 76 R